United States Patent [19]
Malik et al.

[11] Patent Number: 5,577,056
[45] Date of Patent: Nov. 19, 1996

[54] METHOD AND APPARATUS FOR ADJUSTING THE POSTAMBLE FALSE DETECTION PROBABILITY THRESHOLD FOR A BURST TRANSMISSION

[75] Inventors: Imran Malik, Germantown; D. Ray Lowe, Gaithersburg, both of Md.

[73] Assignee: Hughes Aircraft Co., Los Angeles, Calif.

[21] Appl. No.: 394,120

[22] Filed: Feb. 24, 1995

[51] Int. Cl.$^6$ ..................................................... G06F 11/00
[52] U.S. Cl. ........................... 371/57.2; 371/5.1; 375/324
[58] Field of Search ........................... 371/57.2, 48, 57.1, 371/65, 67.1, 5.1, 5.2, 25.1, 20.1, 61, 62; 375/324, 340, 317

[56] References Cited

U.S. PATENT DOCUMENTS

| | | | |
|---|---|---|---|
| 4,686,672 | 8/1987 | Namiki | 370/95 |
| 5,022,024 | 6/1991 | Paneth et al. | 370/50 |

Primary Examiner—Robert W. Beausoliel, Jr.
Assistant Examiner—Phung M. Chung
Attorney, Agent, or Firm—John T. Whelan; Wanda K. Denson-Low

[57] ABSTRACT

A method and apparatus for adjusting the postamble false detection probability threshold for transmission systems that carry telephony network signals using binary-phase shift-keying (BPSK) burst transmission format. The postamble marks the end of a burst transmission. The method and apparatus herein classifies the type of signal present on the telephony network and utilizes a control loop to change the threshold, if necessary, to minimize the probability of false detection of the postamble during demodulation. Transmission of speech signals, which are bursty in nature, suffer little degradation from false detection of a postamble. However, transmission of fax, voice-band data modems and other types of longer-duration signals are severely affected by a false detection of the postamble unique word. Therefore, fax, modem and other longer duration signals have their threshold adjusted to minimize the false detection probability after the signal has been classified as such.

12 Claims, 2 Drawing Sheets

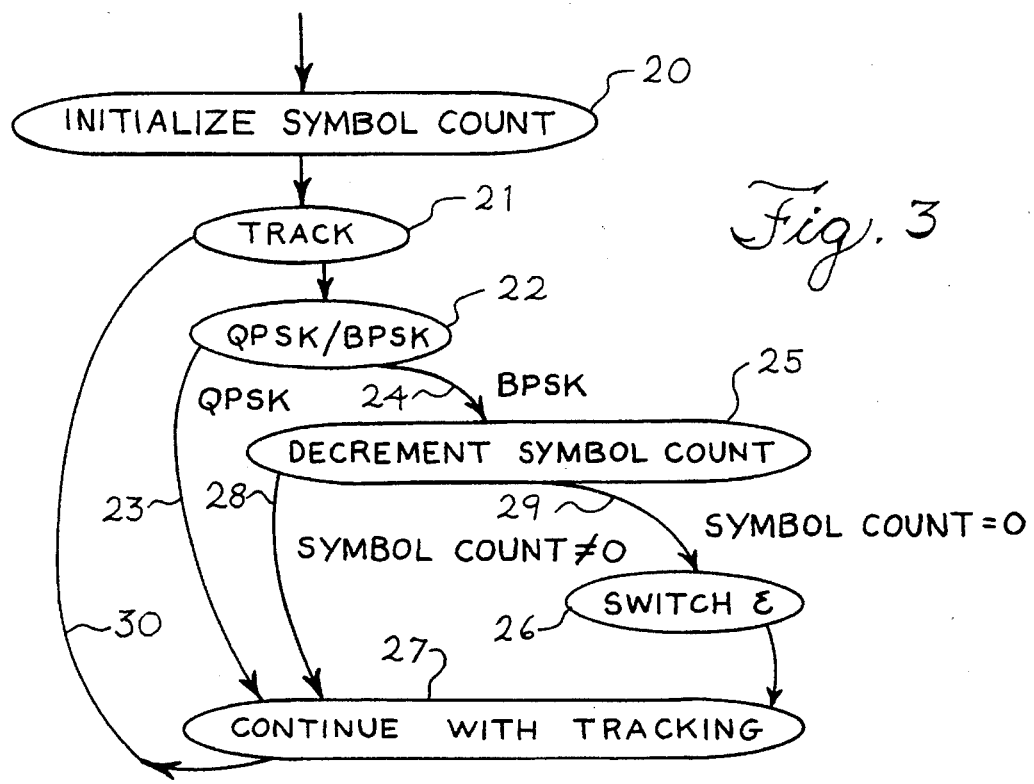

```
DECREMENT THE SYMBOL COUNT BY ONE
CHECK THE SYMBOL COUNT
    IF SYMBOL COUNT = 0
        THEN
        [
            INITIALIZE THE SYMBOL COUNT TO FFFF_hex
            CHECK THE SYMBOL COUNT MULTIPLICATION FACTOR
                IF SYMBOL COUNT MULTIPLICATION FACTOR = 0
                THEN
                [
                    CHANGE THE UNIQUE WORD ERROR
                    DETECTION THRESHOLD 'ε'
                    PROCEED WITH DEMODULATION
                ]
                ELSE
                [
                    DECREMENT THE MULTIPLICA-
                    TION FACTOR BY ONE
                    PROCEED WITH DEMODULATION
                ]
        ]
        ELSE
        [
            PROCEED WITH DEMODULATION
        ]
```

METHOD AND APPARATUS FOR ADJUSTING THE POSTAMBLE FALSE DETECTION PROBABILITY THRESHOLD FOR A BURST TRANSMISSION

BACKGROUND OF THE INVENTION

Very small aperture terminal (VSAT) networks have been developed for reliable and economical data transmission applications. The networks are implemented in satellite telecommunications "star" configurations, wherein a large number of remote VSAT stations access a main "hub" station. The hub is linked to a host computer or ground-based computer network. Remote VSAT stations can access the hub very quickly by relaying their transmissions via fixed-orbit satellites. VSAT technology has also been deployed in point-to-point transmission and receiving configurations known as "mesh" networks, which also operate via satellite relaying. Both of these VSAT network configurations are presently used in wide-ranging applications such as hotel reservation systems, corporate private data and voice networks, stockbroker activities systems, and video receive-only systems.

Due to the increased demand for voice and data service access through these networks, VSAT technology has been extended to telephony applications. "Telephony" systems carry voice and voice-band data from devices such as computers and facsimile systems. Telephony VSAT networks allow both voice and data services to be transmitted via satellite over vast distances almost instantaneously. The telephony VSAT networks are most often used to extend the public phone network into remote areas. Similarly, they are also used to provide emergency communications and disaster recovery. Telephony VSAT networks can also implement private voice/data systems by connecting a number of private branch exchanges (PBX).

A telephony VSAT system consists of multiple remote sites and a central site. Each site consists of an outdoor unit and an indoor unit. The outdoor unit comprises of an antenna, RF electronics and an interfacility link cable (IFL). The indoor unit preferably includes a distribution chassis and channel units. A channel unit provides the compatible interfaces and signalling to the public switched telephone network. The central site is used for network management and assigning calls between the different remote sites. When a call is established, the audio signal, voice-band data, or facsimile signal is modulated after baseband signal processing. The modulated signal is converted into an intermediate frequency (IF) signal and transmitted in time-partitioned packets called bursts. The IF signal is then up-converted to C-band or Ku-band signals and transmitted to a fixed orbit satellite.

The satellite relays the burst to a receiving antenna. The receiving RF electronics performs frequency translation to down-convert the incoming signal to IF. The down-converted signal is then fed into the channel unit. The channel unit has a demodulator which detects the incoming burst, estimates its parameters, and demodulates the burst. The demodulated data is then provided to the receiver baseband processor which converts it into a usable audio, voice-band data, or facsimile signal.

Telephony transmissions may be divided into two broad categories which utilize the same transmission network: 1) speech, which consists of short transmission bursts, typically less than a few seconds long; and 2) voice band data modems, fax, and other types of telephony traffic that have transmission bursts which typically last longer than one minute. Each of these types of transmissions has different characteristics within the bandwidth which must be addressed during demodulation at the receiving end.

While the second category of transmissions usually originates from a steady stream of data, speech transmissions almost always originate from conversant language. Human speech, by its very nature, is very choppy. Relatively long periods of silence are prevalent. In order to conserve power and optimize shared bandwidth during speech-based transmissions, voice activity detection (VAD) algorithms are often used to activate the modulation process only when speech is actually occurring. When VAD is enabled, the resulting modulated transmission is therefore choppy as well.

Bursts are made up of a preamble, user data, and a postamble. The preamble marks the beginning of the burst and the user data, and consists of a bit-timing recovery sequence and a "preamble unique word." The user data contains the voice and/or data information intended to be transmitted. The postamble is appended to the end portion of the transmission burst to mark the end of the user data. In order to determine the end of the user data, a "postamble unique word" is present within the postamble. When the demodulator detects the postamble unique word that matches a predetermined unique word, the demodulator resets and begins to seek the next burst. If the postamble unique word is falsely detected, then the burst is terminated prematurely.

Speech, because it is bursty in nature, can tolerate occasional premature terminations of the speech bursts. Human speech is very redundant and recovery of a prematurely terminated transmission is achieved upon receipt of the very next burst. Recovery for voice-band data modem transmissions and other data telephony traffic, however, is more difficult due to the fact that the burst is much longer and only one postamble is present. In this situation, a false postamble detection can cause a call to be terminated prematurely with no opportunity for recovery. Voice-band data modems, in particular, are especially sensitive to such interruptions in their transmissions.

When receiving modulated bursts, a demodulator uses an error detection threshold for detecting the postamble unique word. The error detection threshold is usually chosen to minimize the probability of missed detection for VAD-enabled transmissions.

In prior art demodulators, a single error detection threshold is used for the demodulator postamble unique word detector. Such systems, however, do not perform optimally where both speech and voice-band data/fax data are transmitted. If a voice-band data modem is present on line or VAD is disabled, frequent postamble unique word false detects can occur. As a consequence, the demodulator assumes that the burst has ended and starts searching for another burst. This causes long pauses in speech during voice calls with VAD disabled. Additionally, when using on-line voice-band data modems, false postamble unique word detects will force the call to be dropped.

SUMMARY OF THE INVENTION

The present invention is directed to a method and apparatus for adjusting the postamble false detection probability in burst-format telephony network systems by classifying the type of signal present on the telephony network. The method and apparatus minimizes the probability of false postamble unique word detection for longer bursts (such as voice-band data or fax data), while providing better performance for the probability of missed postamble unique words for short-duration bursts (such as speech). Instead of using only a single unique word error detection threshold for both speech bursts and voice-band data modem bursts, the invention allows the threshold to be changed when the burst is determined to be of a non-speech origin.

In particular, the invention implements a control loop which keeps track of the symbols demodulated from an incoming modulated signal, determines whether the signal is likely to be a speech burst, and changes the postamble unique word error detection threshold to a lower value if it determines that the burst is a voice-band data modem or facsimile transmission. Therefore, fax, modem and other longer-duration signals have their postamble unique word error detection threshold ($\Sigma$) adjusted to minimize the false detection probability after the category of signal is determined.

As described in further detail below, the control loop is preferably implemented using a digital signal processor (DSP) which is part of a DSP-based demodulator system. The control loop also allows optimization of the threshold before demodulation of the user data information in the burst by changing the threshold (if necessary) during the portion of the burst prior to the bit-timing recovery portion. Thus, the optimum threshold is used immediately to detect the unique word that ends the present burst, further minimizing the likelihood of a dropped transmission due to a false postamble unique word detection.

BRIEF DESCRIPTION OF THE DRAWINGS

FIG. 3 is a flow diagram showing a preferred embodiment of the steps used in the present invention.

FIG. 4 is the algorithm for steps used in the preferred embodiment of the present invention.

DETAILED DESCRIPTION OF THE INVENTION

The preferred embodiment of the invention described below is implemented as part of a system for demodulating quadrature phase shift keying (QPSK) or binary phase shift keying (BPSK) continuous and burst format carrier signals.

Figure 1:
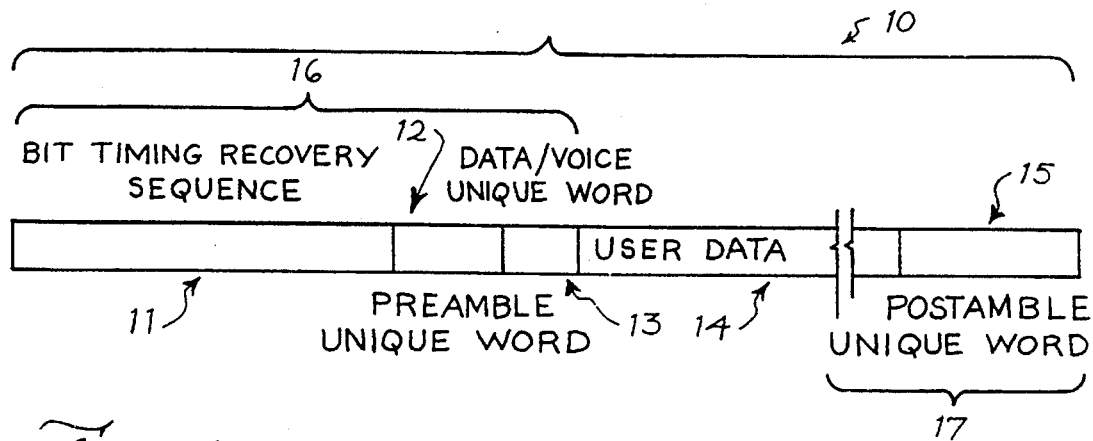
FIG. 1 shows a typical burst format for carrying telephony network signals.

FIG. 1 shows a typical burst 10. The burst 10 is made up of a sequence of data characters called "symbols." The symbols in the burst are divided into predetermined groups: a preamble 16, user data 14, and a postamble 17. The preamble is further divided into a carrier and bit-timing recovery (CBR) sequence 11, a preamble unique word 12, and a data/voice unique word 13. The user data portion 14 of the burst carries compressed telephony signals or system data. The postamble 17 consists of a postamble unique word 15 which marks the end of the user data 14. The postamble unique word 15 is transmitted in both the I and the Q channels for QPSK operation and only in the I channel for BPSK operation.

Figure 2:
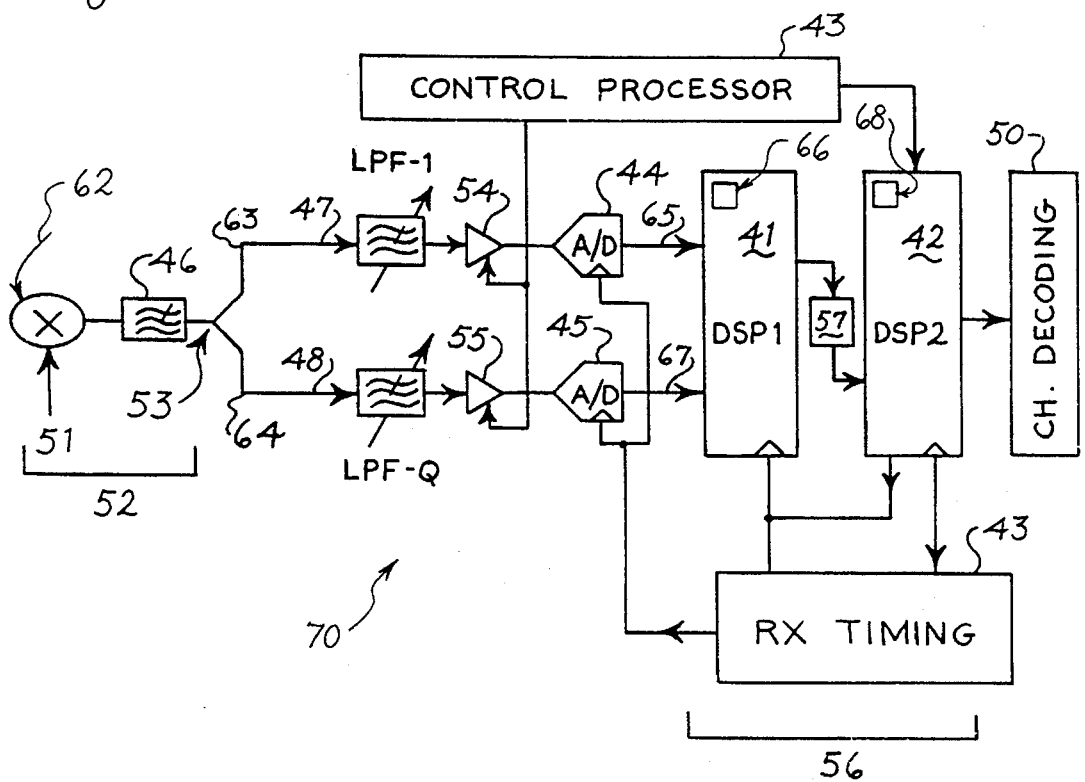
FIG. 2 is a high-level block diagram illustrating a preferred embodiment of the invention using a digital signal processor-based demodulator.

A high-level block diagram of a DSP-based demodulator is shown in FIG. 2. Generally, the system converts the intermediate frequency (IF) to baseband, then detects, demodulates and decodes the IF-modulated signal. In an exemplary embodiment, when detecting bursts, the demodulator supports the following operating modes:

(A) Aloha Mode: The VSAT system uses short data bursts originating at the remote earth station to communicate with the Network Control Center;

(B) Voice Activity Detection Enabled: The bursts carry telephony signals. The burst transmission is dependent upon speech activity detection. In this mode the burst length is random and the arrival time at the demodulator is also random;

(C) Voice Activity Detection Disabled: The bursts carry telephony signals. The preamble is transmitted only once and the burst data portion is as long as the duration of the call.

The demodulator in FIG. 2 consists of a down converter 52, which translates the received intermediate frequency (IF) carrier signal 62 in the range of 52 MHz-88 MHz, to the frequency of the quadrature detector (4 MHz-5 MHz). Down converter 52 consists of two down-conversion stages (not shown in the block diagram). The first stage uses a local oscillator signal from a coarse frequency synthesizer. The output frequency of the coarse synthesizer can be adjusted in the range of 172–208 MHz. The mixed signal is then passed through a bandpass filter with a center frequency of 120 MHz. The filter output is then down converted in a second stage by mixing the output signal with the signal from a second oscillator which produces a fixed signal at 124.5 MHz. The down-coverted signal is then passed through a low-pass filter 46, which has a bandwidth of 6 MHz. Suitable frequency synthesizers are MC145158 available from Motorola with a 10 MHz temperature-controlled crystal oscillator TCO-519A, available from Toyocom, as a frequency reference.

Next, the quadrature detector 53 translates the output of the down converter to baseband I and Q channel signals. The I signal is designated by numeral 63, and the Q signal by 64. A suitable quadrature detector is implemented using two balanced SBL-1 mixers available from Mini-Circuits. Each baseband component is then fed through programmable baseband low-pass filters 47 and 48, respectively, to remove the adjacent channels and excess noise from the desired channel. Suitable low-pass filters are MAX 262 switched capacitor filters available from Maxim. The cutoff frequency of the low-pass filters are chosen to be a factor of the operating symbol rate.

Prior to conversion from analog to digital signals, the amplitude of the filtered signal is adjusted by the receive automatic gain control (AGC) 54 and 55. The AGC loop is implemented by the control processor 43. The control processor 43 adjusts the gain by programming the AGC digital to analog converter (DAC). A suitable DAC is DAC7800 available from Burr Brown. The AGC maintains an optimum signal level into the analog/digital (A/D) converters over the operating frequency and temperature range such as a frequency range of 52–88 MHz and temperature range of 0–55 degrees centigrade.

Conversion from the baseband I and Q channel signals to digital format signals 65 and 67 is performed by two high speed, 8-bit (minimum) A/D converters 44 and 45. The converters operate at a sample rate of 16×R, where R is the symbol rate. The timer 49, which is implemented on a field-programmable gate array (FPGA) device, such as a XC3042 available from XILINX, provides the sampling clock to converters 44 and 45. Suitable A/D converters are MP7684 available from Micro Power Systems.

The demodulation of the I and Q component signals takes place in demodulator 56 via logic implemented over two fixed-point digital signal processors (DSP's) 41 and 42. In an exemplary embodiment, Texas Instruments model TMS 320C25 DSP's are used, although other types of processors and logic implementations may be used, including floating-point DSP's. The DSP's recover the data, timing, and synchronization from the baseband signals. The two DSP's communicate with each other using a 16-bit first-in-first out (FIFO) memory 57 and the DSPs' serial ports. A suitable FIFO is IDT 7201 available from Integrated Device Technology, Inc.

In order to control the demodulation process, the control processor 43, an 8-bit embedded microcontroller device, exercises control over the demodulator and the other blocks of the system. Hardware and inputs to the DSP demodulator 56 are controlled by processor 43. Timing generator 49 controls the input of symbols during the demodulation process. The incoming signals are first sent to DSP 41, the preprocessor, which performs matched filtering and phase rotation on the signal. DSP 42 then operates on the matched-filtered and phase-adjusted signal and performs the demodulation sequentially, one symbol at a time. In the preferred embodiment, DSP 42 also runs logic, preferably in the form of firmware which implements the method of the present invention, and has a memory allocation area 68 that can store a predetermined unique word.

After demodulation of the incoming signal is completed, the data recovered by the DSP's 41 and 42 is passed to the channel decoding block 50. Another FPGA implements the decoding function in this block in a manner known in the art.

Before demodulation begins in the system, the nature of the incoming burst, i.e., whether the burst carries speech or voice-band data, is not known to the demodulator 56. The postamble unique word 15 is detected in the system by a correlator implemented on DSP 41. The unique word is declared when the correlator produces a peak such that its value is higher than a pre-assigned threshold. Successful detection of the postamble unique word 15 is necessary to mark the end of the burst 10. Once the demodulator has detected the postamble unique word 15, the demodulator firmware is re-initialized to prepare for another burst.

If the received unique word has a number of errors, the amplitude of the correlation peak is decreased by a proportional amount. The number of such errors is the error detection threshold (also known as the correlation threshold "$\Sigma$.") For a $\Sigma$ of 0, the received unique word must match exactly with a unique word stored in the memory of DSP 42. In this case the probability of missing the unique word ($P_{miss}$) is very high because the demodulator must not detect any errors in the unique word in order to declare detection of the unique word. In typical data transmission applications, errors may often be present in the signal due to factors that tend to corrupt the transmission quality, such as additive channel noise, phase noise, frequency offsets, doppler, and co-channel interference. Thus, when the correlation threshold is 0 it is likely that demodulation will continue even after the burst has ended. On the other hand for $\Sigma=0$ the probability of false detect ($P_{false}$) is minimum. The error detection threshold is chosen such that $P_{miss}$<<threshold bit error probability and stored in memory 66 on DSP 41. The probability of detecting the unique word ($P_{uw\text{-}detect}$) is a function of the transmission bit error rate (p), the size of the unique word (N) and the error detection threshold ($\Sigma$). The probability can be evaluated using the following equation:

$$P_{UW\text{-}detect} = \sum_{i=0}^{\epsilon} \binom{N}{i} p^i (1-p)^{N-i}$$

The probability of missing the unique word ($P_{miss}$) is given in the following set of equations:

$$P_{miss} = 1 - P_{UW\text{-}detect}$$

$$P_{miss} = \sum_{i=\epsilon+1}^{N} \binom{N}{i} p^i (1-p)^{N-i}$$

The probability of false detect ($P_{false}$) refers to the chance that a random data pattern will align itself exactly with the stored unique word pattern. $P_{false}$ is a factor of the length of the unique word. It is a minimum for an $\Sigma$ of 0 and increases with increasing $\Sigma$. $P_{false}$ is given by the following equation:

$$P_{false} = \frac{1}{2^N} \sum_{i=0}^{\epsilon} \binom{N}{i}$$

The following example illustrates a system utilizing an unchanged, predetermined $\Sigma$ value for a VAD-enabled system. Assuming that VAD is enabled in a system, an $\Sigma$ of 10 can be used for the postamble unique word detection for BPSK. For a transmission bit error rate of $1\times10^{-3}$, this value of $\Sigma$ ensures a $P_{miss}$ of $2.62\times10^{-17}$ and a $P_{false}$ of $9.98\times10^{-9}$. At a symbol rate of 21.333 Kilo-symbols-per-second (ksps), the mean time between false detections of the unique word is only 1.30 hours. Thus, for voice-band data modem calls or for speech activity detection disabled calls, the postamble will probably be falsely detected at some time. This will cause interruption in communication and can result in call termination, especially for voice-band data modems. This is unacceptable, and better performance is required.

The invention determines the nature of the burst, i.e., whether the burst carries speech or voice-band data. The $\Sigma$ value is switched where necessary to minimize false detection of the postamble unique word during voice-band data or facsimile transmissions.

A preferred method of the logic for changing the threshold is shown in the flow diagram of FIG. 3. Since the demodulator does not have any prior knowledge of the type of traffic, the signal is classified (i.e. speech or voice-band data mode/fax) based on the length of the user data portion of the burst. A signal classification threshold time $FFFF_{hex}$ is first chosen to determine the length of time before a signal is recognized as non-speech. $FFFF_{hex}$ is multiplied by 3 (noted as $3\times FFFF_{hex}$) in order to amplify the value for use in the comparator. Because the incoming symbols arrive at a predetermined rate, $3\times FFFF_{hex}$ is essentially a time quantity value for a signal length.

After initialization of a symbol count in DSP 42 using a counter routine, demodulation or "tracking" is begun, and the demodulator keeps count of the number of symbols that it has demodulated via the symbol count. A comparator routine implemented on the DSP compares the symbol count with the $3\times FFFF_{hex}$ value. If the demodulated number of symbols is less than $3\times FFFF_{hex}$, a speech burst is assumed and $\Sigma$ is not switched. However, if the demodulated number of symbols equals or exceeds $3\times FFFF_{hex}$, then a voice-band data modem or a fax call is assumed and the value of $\Sigma$ is switched.

As shown in the flowchart of FIG. 3, the symbol count is initialized as shown in box 20. The symbol count is set equal to the number of symbols represented by $3\times FFFF_{hex}$. Given the known symbol rate of 21.333 ksps, the initialized symbol count represents the time value $3\times FFFF_{hex}$ (9.2158 seconds).

The demodulation is next begun with the demodulation of the first symbol in the burst (box 21). The demodulator next determines whether the symbol is of QPSK or BPSK origin (box 22). If the symbol is in QPSK format, a speech burst is assumed and tracking is continued (box 27) via loop 30 without changing the Σ value.

If the symbol is determined to be of BPSK origin, the set symbol count is decremented by one. The problem of postamble false detection is not severe for the QPSK case, since the postamble unique word has to be detected independently in the I and the Q-channels. Thus, the P false for the QPSK case will be:

$$P_{false} = (P_{false})^2$$

where $$P_{false} = \frac{1}{2^N} \sum_{i=0}^{\epsilon} \binom{N}{i}$$

which is the probability of false detection of one postamble unique word.

If the symbol count has not been decremented completely (determined at 28 in flowchart), the symbol count must therefore be less than the originally chosen $3 \times FFFF_{hex}$. In this case, a speech burst is assumed and tracking is continued (box 27) via loop 30. The next symbol is then demodulated without changing the Σ value.

However, if the symbol count is completely decremented (determined at 29 in flowchart), the duration of the signal equals the original $3 \times FFFF_{hex}$ signal length value. In this case, a voice-band data modem or a fax call is assumed and Σ is switched to a lower value (box 26). Tracking is then continued (box 27), via loop 30. The Σ is not switched for the remainder of the burst. The chosen lower value allows the demodulator to proceed with minimum probability that the postamble unique word will be falsely detected. The number of dropped calls is thus minimized with this system.

In a preferred embodiment, in order to optimize performance in the system, two pairs (I and II) of Σ can be chosen for either speech or fax/modem transmissions, based on the specifications and characteristics of the network. The two pairs are as follows:

| Pair | Speech (Short Burst) BurstLength<($3 \times FFFF_{hex}$) | Fax/Modem (Long Burst) BurstLength>($3 \times FFFF_{hex}$) |
|---|---|---|
| I | $\epsilon = 8$ | $\epsilon = 7$ |
| II | $\epsilon = 9$ | $\epsilon = 5$ |

The performance for the different values of Σ are tabulated in the following table:

| Description | Error Detection Threshold ε | $P_{miss}$ | $P_{false}$ | Mean time between false detects for 21.33 ksps BPSK operation |
|---|---|---|---|---|
| Original | 10 | $2.62 \times 10^{-17}$ | $9.99 \times 10^{-9}$ | 1.30 hours |
| Pair I | 8 | $5.02 \times 10^{-8}$ | $2.7813 \times 10^{-10}$ | 46.81 hours |
|  | 7 | $5.20 \times 10^{-8}$ | $3.82 \times 10^{-11}$ | 340.9 hours |
| Pair II | 9 | $5.20 \times 10^{-8}$ | $1.77 \times 10^{-9}$ | 7.35 hours |
|  | 5 | $5.20 \times 10^{-8}$ | $4.5 \times 10^{-13}$ | $2.89 \times 10^{+4}$ hours (3.3 years) |

As shown in the table, the probability of false detection $P_{false}$ decreases appreciably with decreasing Σ. Thus, switching to a lower Σ for long data transmission bursts has the advantage of minimizing the possibility of dropped calls.

The algorithm for the preferred embodiment of the control loop is shown in FIG. 4. This algorithm implements the loop shown in FIG. 3.

Of course, it should be understood that a wide range of changes and modifications can be made to the method and apparatus described above. It is therefore intended that the foregoing detailed description be regarded as illustrative rather than limiting and that it be understood that it is the following claims, including all equivalents, which are intended to define the scope of this invention.

What is claimed is:

1. A method for adjusting a unique word error detection threshold for a burst transmission comprising a sequence of symbols, said method comprising the steps of:
   determining whether a duration of said burst transmission equals or exceeds a predetermined length of time, wherein said predetermined length of time comprises a signal classification threshold representing a number of symbols, said determining step further comprising the steps of:
   compiling a count of the number of symbols; and
   comparing said count to said signal classification threshold and determining whether said count equals or exceeds said signal classification threshold; and
   modifying said unique word error detection threshold for said burst transmission if said burst transmission equals or exceeds said predetermined length of time.

2. A method for demodulating a burst transmission having a sequence of symbols, said method comprising the steps of:
   establishing a unique word error detection threshold number of symbols;
   establishing a signal classification threshold number of symbols;
   demodulating said symbols;
   compiling a symbol count of a number of symbols that have been demodulated, said compiling occurring simultaneously with said demodulation; and
   changing said unique word error detection threshold if said symbol count equals or exceeds said signal classification threshold.

3. A device for adjusting a unique word error detection threshold for a burst transmission comprising a series of symbols, said device comprising:
   a memory having stored wherein a classification threshold number of symbols;
   a demodulator linked to said memory, said demodulator demodulating said symbols;

a counter linked to said demodulator, said counter keeping track of a number of symbols that have been demodulated;

a comparator linked to said counter, said comparator comparing said unique word error detection threshold with said classification threshold; and logic linked to said counter, said logic changing said unique word error detection threshold if said number of symbols that have been demodulated equals or exceeds said classification threshold.

4. The device of claim 3 wherein said demodulator further comprises at least one digital signal processor.

5. A satellite receiver comprising:

a demodulator for demodulating a burst transmission, said demodulator having at least one processor for detecting a set of symbols;

a memory linked to said demodulator for storing a pre-determined length of time value and a unique word error detection threshold;

said processor including logic for determining whether said burst transmission equals or exceeds said pre-determined length of time value, and modifying the unique word error detection threshold for said burst transmission if said burst transmission equals or exceeds said pre-determined length of time value.

6. The satellite receiver of claim 5 wherein said processor comprises a digital signal processor.

7. A satellite receiver comprising:

a down converter connected to receive an intermediate frequency signal and convert the intermediate frequency signal to a low-frequency output signal;

a quadrature detector connected to receive the low-frequency output signal and translate the low-frequency output signal to baseband components;

a plurality of analog-to-digital converters connected to receive the baseband components and translate the baseband components into digital format components;

a demodulator connected to receive the digital format components and demodulate the digital format components, said demodulator including a memory for storing a pre-determined length of time value and a unique word error detection threshold, said demodulator also including logic for determining whether said intermediate frequency signal equals or exceeds said pre-determined length of time value, said logic modifying the unique word error detection threshold if said intermediate frequency signal equals or exceeds said pre-determined length of time value.

8. The satellite receiver of claim 7 further comprising a plurality of low-pass filters connected to receive the baseband components and remove adjacent channels and noise from the baseband components.

9. The satellite receiver of claim 7 further comprising an automatic gain control connected to receive the baseband components and adjust an amplitude of the baseband components.

10. The satellite receiver of claim 9 further comprising a control processor in communication with said automatic gain control, said control processor programming said automatic gain control.

11. The satellite receiver of claim 10 wherein said demodulator is in communication with said control processor.

12. The satellite receiver of claim 7 wherein said demodulator further comprises at least one digital signal processor.

* * * * *